Feb. 5, 1957  A. BLUMBERG  2,780,263
BINOCULAR CARRIER
Filed Dec. 23, 1955
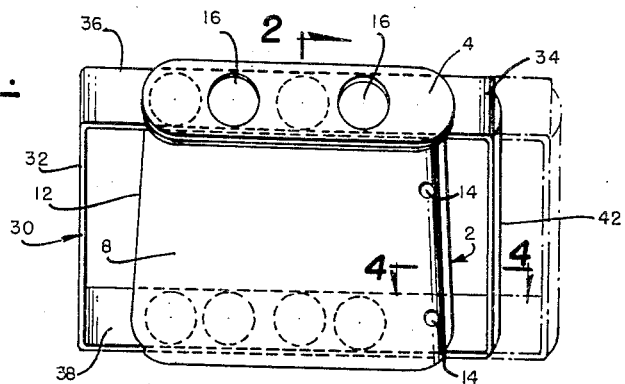
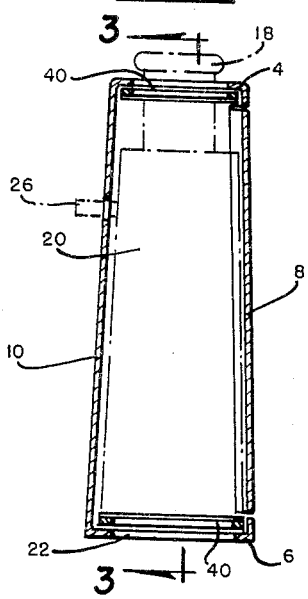
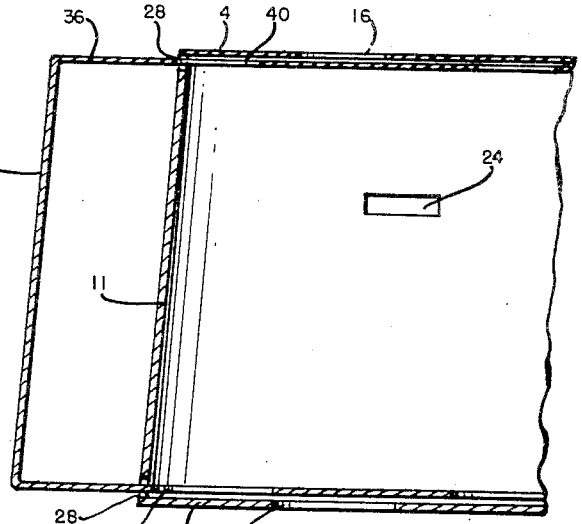
INVENTOR
ARMOND BLUMBERG
BY Irving Holtzman
ATTORNEY

2,780,263
BINOCULAR CARRIER

Armond Blumberg, Cambria Heights, N. Y.

Application December 23, 1955, Serial No. 555,053

5 Claims. (Cl. 150—52)

The present invention relates to field glasses or binocular carriers and, more particularly, to carriers of this type so constructed that the binoculars or field glasses may be used without removing them from the carrier.

Field glasses or binoculars are generally expensive optical instruments that need to be protected from sudden contact with other objects to prevent their breakage. This is true for the whole instrument and particularly in the region of the lenses. It is also often necessary to carry the binoculars or field glasses around for long periods of time and to sight through them for extended periods of time. When viewing must be done for a long period of time, holding binoculars or field glasses of prior art construction becomes quite fatiguing. Furthermore, a good deal of vibration attends the use of prior art instruments which vibration increases as the user becomes fatigued. This causes dizziness and the user must stop to rest before he can resume his viewing. It is also often necessary in the use of binoculars or field glasses that the user be in a position to use the instrument rapidly without the necessity of taking time to remove them from the case.

The present invention is directed to a solution of the above problems.

It is an object of the present invention to provide a carrying case of the type described which is adapted to protect the binoculars or field glasses and at the same time make them available for instant use at a moments notice with only a minimum of effort without removing the instruments from the carrier.

It is also an object of the present invention to provide a carrying case of the type described which may be conveniently carried while the binoculars or field glasses are fully protected.

It is a further object of the present invention to provide a carrying case of the type described wherein the user may use the binoculars or field glasses maintained therein with a minimum of fatigue and for long periods of time with a minimum of vibration of the instrument.

It is another object of the present invention to provide a continuous strap element for a carrier of the type herein described which may be used as a carrying handle and lens protector in carrying position and as a hand rest in the viewing position to reduce fatigue and vibration during use of the instrument.

Other and more detailed objects will be apparent from the following description, claims and drawings.

Reference is made to the accompanying drawings wherein like reference numerals represent the corresponding parts in the various views and in which—

Figure 1 is a perspective view of a device covered by the present invention showing the manner in which the endless strap element may be moved from a carrying position to a viewing position.

Figure 2 is a sectional view of Figure 1 taken along line 2—2 of Figure 1 showing the extended eyepiece and the focusing element.

Figure 3 is a sectional view taken along line 3—3 of Figure 2 with the binoculars removed showing the position of the endless strap element in its carrying position and showing the relationship of the holes in the strap to the holes in the case in the carrying position.

Figure 4 is a partial section taken along line 4—4 of Figure 1 showing the details of the closure means for the cover of the case and the weight balancing means.

Figure 5 is a perspective view of a device covered by the present invention showing the manner of using the present instrument for viewing.

Referring to the drawings, the body of the carrying case is designated generally at 2. It comprises a back wall 4, a front wall 6, a hinged cover member 8, a top wall member 10 and two side wall members 11. Cover member 8 is hinged at 12 to allow cover member 8 to swing outwardly and is further provided with female snap elements 14.

Back wall 4 is provided with circular back case openings 16 which lie adjacent eye pieces 18 of binoculars 20 when the binoculars are positioned in the case. Back circular case openings 16 are large enough to allow for passage therethrough of eye pieces 18 during the focusing of the binoculars.

Front wall 6 of case 2 is also provided with a pair of front wall circular case openings 22 which lie adjacent the front lenses of binoculars 20 when the latter are positioned in the case.

The front wall circular case openings 22 and the back wall circular case openings 16 are so aligned with each other so that when the binoculars are in place in the case there is a clear view through the case and the binoculars.

Top wall 10 is provided with a top wall opening 24 through which focusing elements 26 project when the binoculars are inserted in the case. This allows for focusing of the binoculars while they are inside the case.

Side members 11 are each provided with a pair of slits 28 extending perpendicular to the long axis of side members 11. These slits are cut through side members 11 and are each positioned so that they are close to the ends of side members 11 near the front wall 6 and back wall 4 respectively. In this manner endless strap element 30, which will be described in detail below, may pass through a slit member 28 of a first side member 11 near front wall member 6, through the case and lying adjacent the front wall member 6, through a corresponding slit 28 in the second side member 11, then backward parallel to the second side member 11, then into a slit 28 adjacent the back wall member 4 into the case and lying adjacent to the back wall member 4, through a corresponding slit in the first side member 11 and then frontward parallel to the first side member 11.

The details of the closure means for cover member 8 is shown in Figure 4. Side wall 11 of case 2 shown at the right in Figure 1 is provided with a male snap element 44 which cooperates with female snap element 14 to close the case. Element 44 is mounted on a short extension 46 of side element 11 shown at the right in Figure 1.

Endless strap member 30 comprises a side strap member 32, a balancing weight bearing side strap member 34, a front strap member 38 and a back strap member 36. Front and back strap members 38 and 36 are each provided with a pair of circular strap openings 40 cut therethrough. The length of front and back strap members 38 and 36 are greater than the corresponding length of front and back wall members 6 and 4 respectively so that when strap member 30 is pulled to on either side of the case 2, there is provided a space between the case and strap through which the hand may be inserted.

The circular strap openings 40 are so located on each of the front and back strap members 38 and 36 respectively so that when the strap member 30 is pulled to the right in Figure 1 all of the strap openings 40 are aligned with the circular openings in the top and bottom walls of case 2 and the lenses of the binoculars so that there is a clear view through the case and binoculars. When the strap member 30 is pulled to the left as shown in Figure 3 the strap member 30 acts as a closure for circular openings 22 and 16 of the case and thus affords a protection for the lenses when the instrument is in use.

Side strap member 34 is provided with a balancing weight member 42 to aid in the holding of the case in a steady manner to reduce the vibration of the instrument.

The case and strap elements of the present invention are made of materials which are sufficiently non-rigid as to absorb a certain amount of shock to which the case may be subjected but at the same time being sufficiently rigid as not to be too readily deformed. Leather has these characteristics and is the material that is preferably used. However, many well known plastics having these characteristics may also be used in place of leather. The case and the strap may be made of the same or different materials as described above providing they have the requisite characteristics.

In use the binoculars are placed in the case the focusing element 26 being inserted in opening 24 of top wall 10 which is provided for this purpose. The case is then closed and strap element 30 is pulled to the extreme left as seen in Figure 3 so that the openings in case 2 are closed thus protecting the lenses. There is thus provided a convenient handle which can be used to carry the binoculars about. When it is desired to use the binoculars, strap member 30 is pulled to the right as shown in Figure 1 thus aligning the openings in the strap member 30 with the openings in the top and bottom walls of case 2. The instrument may then be used for viewing. (See Figure 5.) The extension of the strap to the right at this time provides a rest on which the binocular case may be supported for viewing. This greatly reduces the fatigue that would accompany viewing for an extended period of time. The counterbalance weight member 42 further steadies the instrument for viewing. The focusing wheel 26 projects outside of the case and is thus accessible for use. The alignment of the circular openings in back case member 4 and back strap member 36 allows eye pieces 18 to move outside the case during focusing.

There has been described a specific embodiment of the present invention. It is to be understood however, that the present invention is not restricted to this specific embodiment. Many modifications of the present construction may be made without departing from the spirit of the invention.

What is claimed is:

1. In a carrying case for binoculars and the like adapted to be used without removing the binoculars from the case the improvement which comprises providing an endless strap means which extends external of the case the movement of which strap alternately covers and exposes the lenses of said binoculars said strap means having a circumference substantially greater than a circumference of said case, whereby space is provided between said case and externally extending portions of said strap means.

2. A carrying case for binoculars and the like comprising a case member having front, back and two side walls, said front and back walls having openings therein positioned so that the openings in said front wall are in alignment with the openings in said back wall, said side walls each having an opening adjacent each end thereof, an endless strap means provided with openings that correspond to the openings in said front and back case walls and positioned so that it is adjacent said front and back wall of said case on the inside thereof and extends through the openings in said side walls, said strap means being adapted to be moved into a position which will close said front and back case wall openings the circumference of said strap means being substantially greater than the circumference of said case, whereby space is provided between said case and said strap means.

3. A carrying case for binoculars and the like comprising a case member provided with case openings therein to allow for viewing through the case, strap means provided with strap openings which correspond to said case openings, said strap means having a circumference substantially greater than a circumference of said case and being adapted to be moved into a first position which will cover said case openings and at the same time place said strap in a position to function as a carrying handle and further being adapted to be moved into a second position in which said case openings and said strap openings will be in alignment and at the same time place said strap into a position to function as a hand rest.

4. A leather carrying case for binoculars and the like comprising a case member provided with front, back, top, two side walls and a hingedly mounted cover, said front and back walls having openings therein positioned so that the openings in said front wall are in alignment with the openings in said back wall, said top wall being provided with an opening therein to allow for protrusion therethrough of a focusing wheel, said side walls each having a slit adjacent each end thereof for passage therethrough of an endless strap, said endless strap comprising a front portion, a back portion, a first side portion and a second side portion and provided with openings in said front and back portions which correspond to the openings in said front and back walls respectively, said endless strap having a circumference substantially greater than the circumference of the case formed by the front, back and side walls and being positioned so that said front and back portions lie partially inside said case and adjacent said front and back wall respectively and to pass through the slits in said side walls, said first side portion of the endless strap being provided with a balance weight, said endless strap being adapted to be moved by pulling said second side portion which will cover said case openings and at the same time place said strap in a position to function as a carrying handle and further adapted to be moved by pulling said first side portion into a position in which said strap openings and case openings will be in alignment and at the same time place said strap in a position to function as a hand rest.

5. A carrying case for binoculars and the like comprising a case member provided with front, back and two side walls, said front and back walls having openings therein positioned so that the openings in said front wall are in alignment with the openings in said back wall, said side walls each having an opening adjacent each end thereof, an endless strap means having a circumference substantially greater than the circumference of the case formed by the front, back and side walls and provided with openings that correspond to the openings in said front and back case walls and positioned so that it is adjacent said front and back wall of said case and inside thereof and extending through the openings in said side walls, said strap means being adapted to be moved to a first position which will cover said case openings and at the same time place said strap in a position to function as a carrying handle and further adapted to be moved into a second position in which said strap openings and said case openings will be in alignment and at the same time place said strap into a position to function as a hand rest.

References Cited in the file of this patent

FOREIGN PATENTS 727,177    Germany              Oct. 28, 1942